Figure 1:
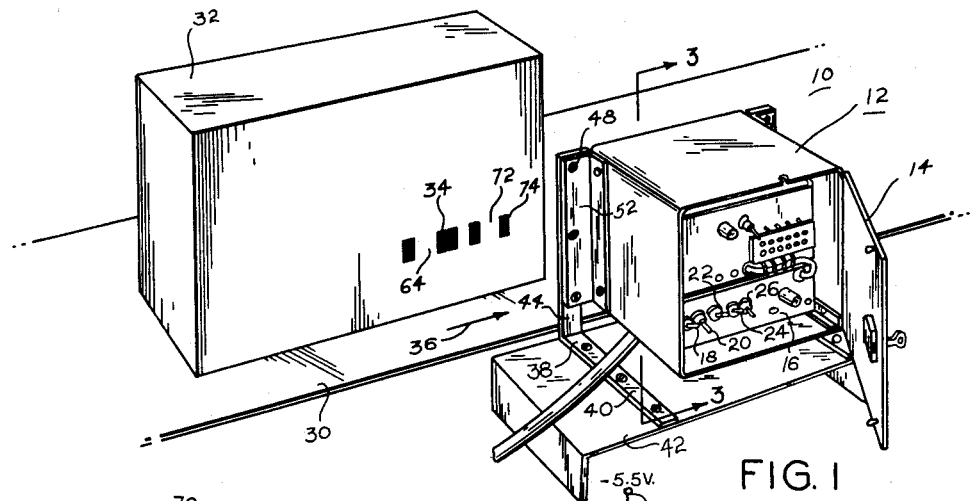

Oct. 6, 1964  R. A. ZUCK ET AL  3,152,256
PHOTOSENSITIVE CODE IDENTIFYING MEANS AND METHOD
Filed Nov. 21, 1958  2 Sheets-Sheet 1

INVENTORS
RAY A. ZUCK
ROBERT C. HILLIARD
BY Jacob Trachtman
ATTORNEY

United States Patent Office 3,152,256
Patented Oct. 6, 1964

3,152,256
PHOTOSENSITIVE CODE IDENTIFYING MEANS AND METHOD
Ray A. Zuck, Lafayette Hill, Pa., and Robert C. Hilliard, Beverly Farm, Mass., assignors to General Atronics Corporation, Bala-Cynwyd, Pa., a corporation of Pennsylvania
Filed Nov. 21, 1958, Ser. No. 775,408
10 Claims. (Cl. 250—209)

The invention relates to detecting apparatus and method, and more particularly to an apparatus and method utilizing a code with a plurality of binary digits for detecting and sorting articles.

Heretofore, detecting devices have been utilized for determining coded information associated with a carrier. Such means, however, have been highly complex in that they serially detect information, and require information storage units for accumulating the information before making a determination. Such serial reading of information also extends the time during which a determination of the code can be made and thereby decreases the operating efficiency and reliability of the apparatus. Difficulties of positively identifying the code which is to be detected by light sensing means due to the conditions of the material being processed and variations in light intensities of the environment further reduces the reliability and accuracy of operation of such devices.

It is therefore a principal object of the invention to provide a new and improved detecting apparatus and method which is highly efficient and reliable in operation.

Another object of the invention is to provide a new and improved detecting apparatus and method which utilizes concurrent detection of all the digits of a code and eliminates the requirement for storage and other complex mechanisms.

Another object of the invention is to provide a new and improved detecting apparatus and method especially adapted for simultaneously reading an entire code on moving objects such as articles to be sorted.

Another object of the invention is to provide a new and improved detecting apparatus and method which uses light for detecting the code and is highly reliable in distinguishing the characters of the code.

Another object of the invention is to provide a new and improved detecting apparatus which is highly compact in size, may be set for reading any desired code or codes and may be utilized in conjunction with standard article conveying and sorting apparatus.

Another object of the invention is to provide a detecting apparaus utilizing highly efficient circuitry including transistor means.

Another object of the invention is to provide a detecting apparatus which may be designed to operate on standard printed material of various containers moving along a conveyor path for the purpose of counting, sorting, or classifying.

Another object of the invention is to provide a new and improved detecting apparatus which may momentarily detect a code having a plurality of binary digits and effectively produce an output signal for operating a required load over a prolonged period of time.

Another object of the invention is to provide a new and improved detecting apparatus which is readily constructed, inexpensive in cost and trouble free in operation.

The foregoing objects and other objects of the invention are achieved by providing a detecting apparatus comprising a plurality of detectors each having a pair of light sensing elements each positioned for detecting binary characters formed of light and dark fields. Each of the detectors delivers a signal upon its detection of a respective selected binary character. A device is provided for determining the selected binary characters for each of the detectors. A signal means which is responsive to the output signals from each of the detectors, delivers an output signal upon the concurrent delivery of the signals by each of the detectors. Thus, upon the concurrent detection of each of the digits of a selected code by their respective detectors, an output signal is delivered by the signal means signifying the occurrence of the detected code.

The method of sorting articles comprises applying a code having a plurality of detectable binary digits to an article to be sorted, placing each of the digits on the articles at predetermined positions with respect to the other digits of the code, concurrently detecting each of the digits at the predetermined positions, and determining the code represented by the detected binary digits.

Figure 2:
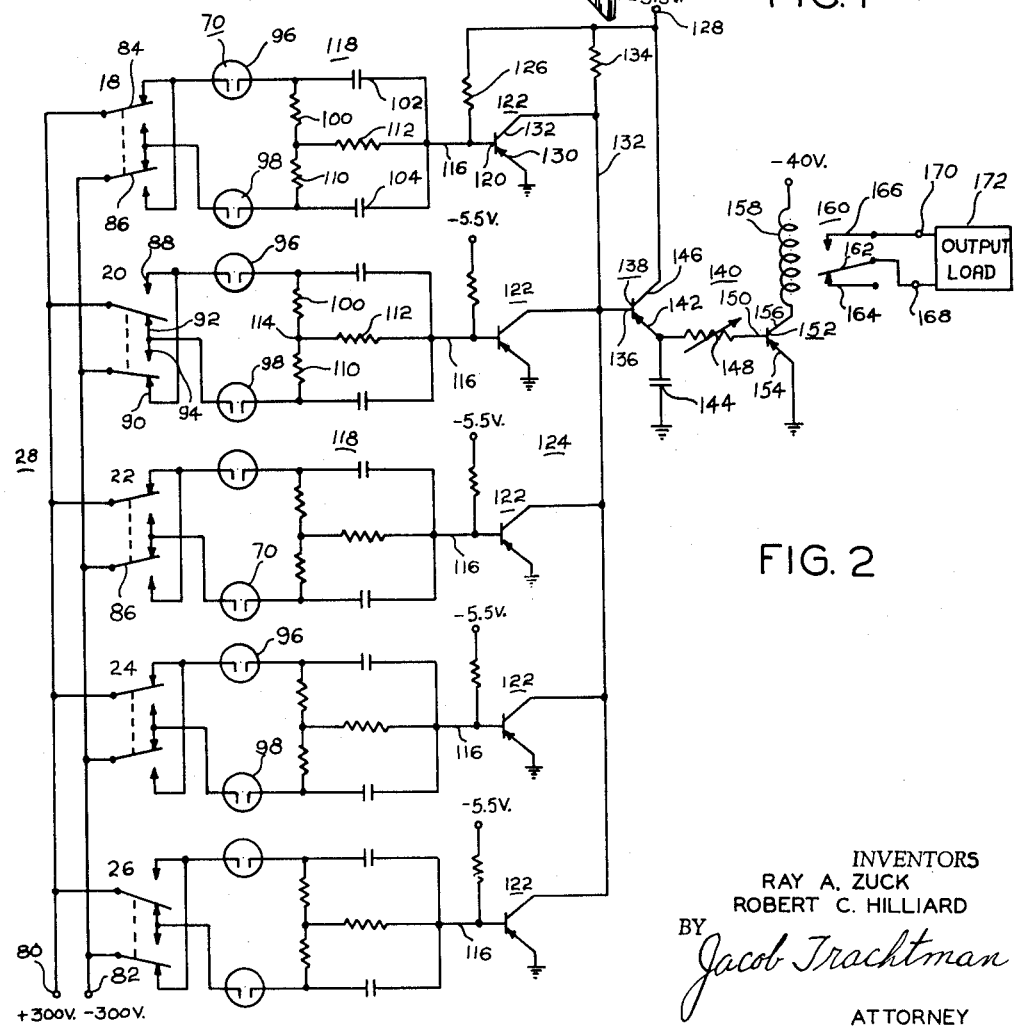
Figure 3:
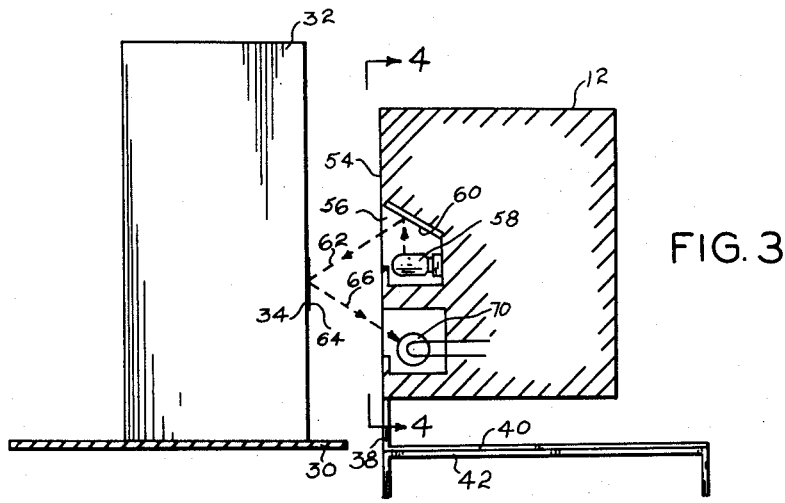
Figure 4:
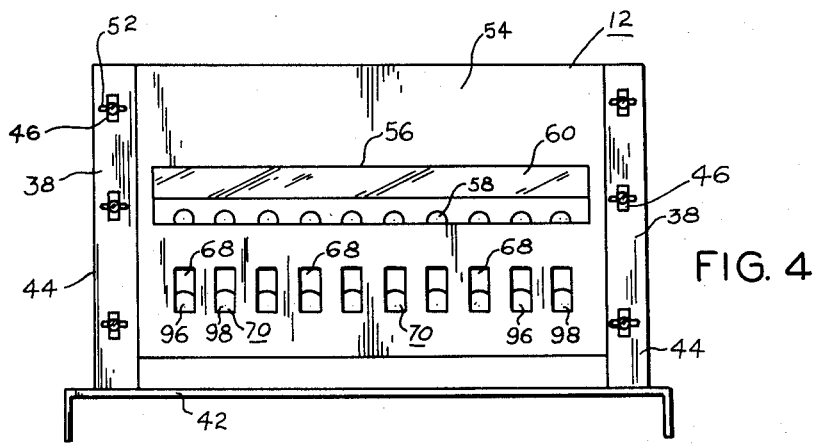
Figure 5:
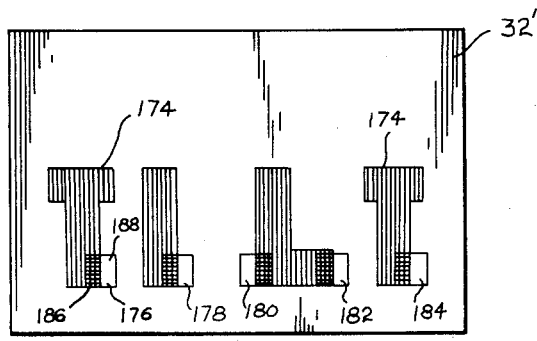

Referring now for greater detail to the drawings, which illustrates particular embodiment of the invention, in which like parts are referred to by like reference characters and values of potential are given for illustration only and not in order to limit the scope of the invention:

FIGURE 1 is a perspective view illustrating the mechanical form of the detecting apparatus during a detecting operation, FIGURE 2 schematically illustrates the electrical form of a detecting apparatus embodying the invention, FIGURE 3 is a sectional view taken on the line 3—3 of FIGURE 1 with portions omitted, FIGURE 4 is an elevational view taken in the direction of line 4—4 of FIGURE 3, and FIGURE 5 is the plan view of an article bearing imprinted characters embodying a detectable code.

Referring to the figures, a detecting apparatus 10 comprises an enclosed container 12 having a hinged door 14 exposing a chassis 16 supporting the electrical circuitry of the detecting apparatus.

The chassis 16 supports a plurality of individually operable toggle switches 18, 20, 22, 24 and 26, comprising a potential switching means 28 of the apparatus 10. The container 12 is supported along the path of a conveyor means or belt 30 carrying articles 32 in a direction 36 past the apparatus 10 and bearing coded indicia 34. The container 12 is supported by a pair of L brackets 38 with their horizontal legs 40 secured with a supporting table 42. The vertical legs 44 of the brackets 38 are provided with vertical slits 46 (see FIGURE 4) receiving therethrough the threaded ends of bolt means 48 which are secured with vertical side brackets 50 attached to the container 12. The bolt means 48 receive thumb nuts 52 on their threaded ends for securing the container 12 to the brackets 44. This arrangement allows the ready removal of the device 12 and its replacement, while the slits 46 allow its vertical positioning or adjustment with respect to the conveyor means 30.

The front vertical surface 54 of the container 12 is provided with a horizontally extending opening 56 through which light is radiated from a plurality of bulbs 58. The light from the bulbs is directed in a downward direction through the opening 56 by a mirror or highly polished surface 60 angularly positioned above the bulbs 58.

As seen from FIGURE 3, the light is directed in a downward direction 62 for impingement upon the horizontal regional 64 bearing the code 34. The non-absorbed light passes along a downward path 66 through a plurality of openings 68 to respective photosensitive elements 70.

The code 34 comprises a plurality of binary digits: in this case the use of five binary digits is illustrated, each digit comprising a light field 72 and a dark field 74. This arrangement allows two possible indications for each digit by reversal of light and dark fields providing binary information. If the dark field 74 of a digit appears to the left of its light field 72, this may be taken to indicate a "zero" number, while if the dark field 74 is to the left of its light field 72 this may be used to represent the number "one." Thus, reading the binary code 34 shown in FIGURE 1 on the carton 32 from left to right, it represents the numeral 101100. It is noted that each of the dark and light spaces occupy equal area and are positioned side by side along the region 64 in the direction of motion 36 of the conveying means 30. Corresponding to this, the openings 68 in the front surface 54 of the container 12 are similarly arranged and spaced along the line of motion 36 of the container 32 so that each momentarily registers with the center portion of a respective field of the code 34. Since five digits are used in the code 34, ten openings 68 are provided, since there are two fields, a light field and dark field, for each binary digit. In this respect, the fields of the binary digits need not be arranged with respect to each other to extend in the direction of motion 36 of the container 32 as illustrated, but may be oriented in any desired configuration, that is, having arbitrarily predetermined vertical and horizontal coordinate positions, with the openings 68 similarly positioned to provide concurrent registrations with each of their respective fields during a momentary passage of the container.

Referring to FIGURE 2, the switching means 28 has a pair of input terminals 80, 82 respectively connected to positive and negative potentials of 300 volts. The switches 18, 20, 22, 24 and 26 are of the double pole double throw type, each having its first armature 84 connected to the positive potential terminal 80 while its second armature 86 is connected to the negative potential terminal 82. The contact 88 of each switch of the switching means 28 is connected to its contact 90, while its contacts 92 and 94 are similarly joined together. Each of the switches of the switching means 28 is associated with a respective detector 118 each having a pair of light sensing element 96, 98 generally designated as elements 70. The light sensing elements 70 may be of the voltaic, photo-electric or photo-resistor or any other type responsive to light intensity. For example, the photo-resistor cell of the type designated CL-3 or CL-403 made by Clairex may be utilized.

The elements 70 are provided with two electrodes. The first electrode of element 96 is connected with the contacts 88, 90 of its associated switch, while the first electrode of the element 98 is joined to the contacts 92, 94 of this switch. The second remaining electrodes of each of the elements 96, 98 are connected to each other by series resistors 100, 110. A resistor 112 bridges the junction 114 of the resistors 100, 110 and an output lead 116. The capacitors 102 and 104 respectively connect across the resistors 100 and 112 and resistors 110 and 112 between respective elements 96, 98 and the lead 116. Each pair of elements 96, 98 and its associated circuitry comprises one of the detectors 118 respectively delivering an output signal on its lead 116 with the detection of a selected binary digit.

Each of the output leads 116 is connected to the base electrode 120 of a corresponding one of a plurality of transistor means 122 of a signal means 124 for detecting the concurrent delivery of signals by each of the detectors 118. The transistor means 122, for example, may be of the RCA 2N136 type. The transistor means of the embodiment of the apparatus 10 disclosed, is of the PNP type, although other types of valves or transistors may be utilized with appropriate circuit modification.

Each of the transistor means 122 has its base electrode 120 returned through a bias resistor 126 to a negative potential terminal 128 of 5.5 volts. The emitter electrode 130 is directly returned to ground potential, while the collector electrodes 132 of all of the transistor means 122 are joined together to a common bus 132. The bus 132 is returned to the negative potential terminal 128 through a load resistor 134.

The transistor means 122 have their base electrode 120 negatively biased so that they are normally conducting. Conduction of any one of the transistor means 122 maintains bus 132 at substantially ground potential. Upon the concurrent delivery by the output leads 116 of the detectors 118 of positive going signals to each of the transistor means 122, the transistor means 122 become non-conducting causing negative drop in the potential of the bus 132. The conduction of any one of the transistor means 122, however, will prevent this negative excursion.

The negative bus 132 is connected to the base electrode 136 of the normally non-conducting transistor means 138 of a signal prolonging network 140. The transistor means 138 which is also of the PNP type has its emitter electrode 142 bridged to ground potential through a capacitor 144, while its collector electrode 146 is directly returned to the negative potential bus 128. The emitter electrode 142 of the transistor means 138 is also connected by a variable discharge resistor 148 to the base electrode 150 of a normally non-conducting output transistor 152.

The emitter electrode 154 of the transistor means 152 is directly connected to ground, while its collector electrode 156 is connected through the energizing coil 158 of a relay 160 to a negative potential of 40 volts.

The relay 160 has an armature 162 which normally engages its open contact 164, while engaging its contact 166 when its coil 158 is energized. The armature 162 and contact 166 are respectively connected to terminals 168, 170, which are joined to the input conductors of an output load means 172 which may be a conveyor switch, recording, calculating or similar means.

In operation, the switching means 28 has its switches 18, 20, 22, 24 and 26, set to a selected code. The switches of the switching means 28 are shown in FIGURES 1 and 2 to be set for detecting the code number 10110, which corresponds to the code 34 imprinted with corresponding dark and light fields on the article 32. As the article moves along the conveyor, the elements 70 receive signals which may represent various code numbers, or no code number at all in which case both of the pair of elements 96, 98 of the detectors 118 receive substantially the same intensity of light. Under these conditions, the resistance of the elements 96, 98 of each of the detectors 118 is equal, so that the voltage provided at the junction point 114 of resistors 100, 110 provides a signal on the output lead 116 which is negative with respect to the ground potential. This maintains all of the transistor means 122 in their normally conducting state providing a signal which is substantially at ground potential on the bus 132. The transistor means 138 of the network 140 remains in its normally cut off or non-conducting state which in turn provides a relatively positive signal to the output transistor 152 maintaining the relay 160 deenergized.

If a detector 118 detects a binary digit, one of its elements 96, 98 receives a greater intensity of light than its other element. This causes the signal delivered at the output lead 116 to swing positively or negatively depending upon whether the digit is a "one" or "zero" and the setting of its switch. It for example, as is illustrated by the figures, the switch 18 is set to its "one" position and its associated elements 96, 98 detect a "one" binary digit, the element 96 receives a greater intensity of light than its associated element 98. This causes the output voltage on the lead 116 to swing positively, corresponding to delivery of an effective output signal. The delivery of this positive going output signal to the associated transistor means 122 of the signal means 124 results in its cut off. In this manner, if each of the detectors 118 detects the digit to which its associated switch of the switching means 28 is set, each of the transistor means 122 is cut off, resulting in a negative excursion of the signal on the bus 132.

It is thus noted that the actuation of a switch of the switching means 28 results in the reversal of potential difference delivered to its associated light sensing elements 96, 98 presetting it for the delivery of an output signal when the corresponding digit is detected by the particular detector 118. Thus, by selectively setting each of the switches 18, 20, 22, 24 and 26 of the switching means 28, any code or binary number may be preset for recognition by the detecting apparatus 10. The delivery of a negative going signal to the transistor 138 upon the detection of a preset code number, renders it conductive allowing its storage capacitor 144 to become charged before it returns to its non-conductive state. This is important, since if the article 132 is moving at a rate of about 200 feet per minute, the detecting apparatus 10 may register the code 34 during an extremely short interval of time, such as 200 milliseconds. Such a short period of time is insufficient to operate the relay 160. The network 140 by the rapid charging of its capacitor 144 provides a prolonged output signal. The network 140 can increase the duration of its output signal by a factor 30 over its input signal. The prolongation of the output signal may be controlled by varying the resistance value of the resistor 148 which in combination with the capacitor 144 provides an adjustable RC time constant.

Thus, with the momentary conduction of the transistor means 138, the capacitor 144 is sufficiently charged before the transistor is again cut off, so that it supplies a negative signal through the resistor 148 to the base electrode 150 of the transistor 152. During the application of this negative signal, the transistor 152 is rendered conductive, causing the energization of the coil 158 of the relay 160. The energization of the relay 160 supplies an output signal to the output load means 172 for carrying out the sorting or other desired operation.

The use of a pair of light sensing elements 96, 98 for each of the detectors 118 for detecting binary digits increases the reliability of operation of the apparatus 10, since similar variations in the amplitude of light received by both of the elements 96, 98 has no effect on the apparatus. By this means the apparatus is also made more sensitive in detecting slight differences in amplitude between the dark and light fields. The particular circuit arrangement associated with the sensing elements 96, 98 of the detectors 118 also provides high reliability. The utilization of the capacitors 102, 104 respectively bridging the resistors 100, 112 and resistors 110, 112, also act to increase the responsive speed of the apparatus 10, while network 140 assures the response of the apparatus even to detected signals of short duration.

The concurrent recognition of each of the digits of the code 34 also eliminates the storage requirement for sequentially detected digits and results in an instantaneous detecting operation, greatly increasing the efficiency and reliability of the apparatus.

In order to illustrate the great versatility of the apparatus 10 and its method, the FIGURE 5 discloses a carton 32′ having printed letters 174 which may be a trademark or any other matter occurring on the articles 32′ which may be used as a binary code for identification and detecting purposes. The binary code is made up of the digits 176, 178, 180, 182 and 184 utilizing portions of the letters 174 ordinarily printed upon the articles 32′. Each of the digits is binary in nature, having a dark field 186 and a light field 188, as explained above. In the notation previously used, this code would represent the number "11011." Of course, the detectors 118 and their associated pairs of sensing elements 96, 98 are appropriately arranged and positioned to simultaneously register with the digits 176, 178, 180, 182 and 184. As already noted the several switches of the switching means 28 may be set to determine any desired code which the apparatus 10 is to detect.

It will be obvious to those skilled in the art that the invention may find wide application with appropriate modification to meet the individual design circumstances, but without substantial departure from the essence of the invention.

What is claimed is:

1. A system for identifying an optical code employing a plurality of code areas, said system comprising: a plurality of light sensitive means respectively sensing the light reflection from different ones of said code areas; means responsive to the sensing by said light sensitive means of predetermined contrasts between the light reflections from the members of different pairs of said areas to produce a plurality of electrical signals distinctively different from those produced in response to any other relationships between said reflections; and means responsive to the simultaneous production of said distinctive signals by all of said sensing responsive means to produce an indication of code identification.

2. The system of claim 1 further characterized in that each of said light sensitive means is a photocell, different ones of said photocells being situated to pick up light reflected from different ones of said code areas.

3. The system of claim 2 further characterized in that said photocells are grouped in pairs corresponding to said pairs of areas from which they pick up reflected light.

4. The system of claim 3 further characterized in that said reflection sensing responsive means comprises two sources of oppositely poled unidirectional potentials, different ones of said sources being interchangeably connected to the different photocells in each said pair.

5. The system of claim 4 further characterized in that said reflection sensing responsive means further comprises a plurality of circuits respectively interconnecting the members of different pairs of said photocells and balanced with respect to said unidirectional potentials when the light reflections from the members of the corresponding pair of code areas are substantially equal, while being unbalanced when said light reflections are unequal.

6. The system of claim 5 characterized in that the polarity of said unbalance is reversed by interchange of said unidirectional potential connections.

7. The system of claim 6 further characterized in that said means for producing a code identification indication comprises electrically controllable impedance means connected to all of said photocell interconnecting circuits and responsive to simultaneous unbalance of one said polarity in all of said circuits to assume one impedance value while being responsive to any other condition of balance and unbalance of any of said circuits to assume a second impedance value.

8. The system of claim 7 further comprising means responsive to assumption by said impedance means of said one and said other value, respectively, to develop two distinctively different potentials across said impedance.

9. The system of claim 8 further comprising means responsive to the production of said potential corresponding to assumption of said one value to prolong the existence of said potential beyond the period during which said one value is assumed.

10. The method of identifying objects which comprises the steps of: applying to each of said objects a code consisting of plural pairs of code areas, the members of each pair having mutually contrasting light reflection characteristics; exposing the said codes applied to different ones of said objects in succession to a plurality of pairs of light sensing means, one pair for each said pair of code areas; and deriving from said pairs of light sensing means an indication of object identification in response to simultaneous sensing by each pair of said sensing means corresponding to a pair of said code areas of a predetermined light contrast in reflection characteristics between the members of said last-named pair of areas.

References Cited in the file of this patent

UNITED STATES PATENTS

| | | |
|---|---|---|
| 1,922,188 | Zworykin | Aug. 15, 1933 |
| 2,000,403 | Maul | May 7, 1936 |
| 2,224,646 | Friedman et al. | Dec. 10, 1940 |
| 2,612,994 | Woodland et al. | Oct. 7, 1952 |
| 2,657,799 | Johnson | Nov. 3, 1953 |
| 2,783,389 | Cummings et al. | Feb. 26, 1957 |
| 2,871,378 | Lohman | Jan. 27, 1959 |
| 2,872,590 | Leavens | Feb. 3, 1959 |
| 2,892,101 | Bright | June 23, 1959 |
| 2,899,132 | Orthuber | Aug. 11, 1959 |
| 2,901,089 | Rabinow et al. | Aug. 25, 1959 |
| 2,936,886 | Harmon | May 17, 1960 |

UNITED STATES PATENT OFFICE
CERTIFICATE OF CORRECTION

Patent No. 3,152,256                         October 6, 1964

Ray A. Zuck et al.

It is hereby certified that error appears in the above numbered patent requiring correction and that the said Letters Patent should read as corrected below.

Column 3, line 9, for "regional" read -- region --; line 12, for "digits:" read -- digits; --; line 23, for "101100" read -- 10110 --; same column 3, line 54, for "element" read elements --.

Signed and sealed this 8th day of February 1966.

EAL)
test:

NEST W. SWIDER                                 EDWARD J. BRENNER
esting Officer                                       Commissioner of Patents